US012434516B2

(12) United States Patent
Woolsey

(10) Patent No.: US 12,434,516 B2
(45) Date of Patent: Oct. 7, 2025

(54) PRESSURE SENSITIVE VALVE CORE

(71) Applicant: Drew M Woolsey, Helena, MT (US)

(72) Inventor: Drew M Woolsey, Helena, MT (US)

( * ) Notice: Subject to any disclaimer, the term of this patent is extended or adjusted under 35 U.S.C. 154(b) by 514 days.

(21) Appl. No.: 17/919,296

(22) PCT Filed: May 18, 2022

(86) PCT No.: PCT/US2022/029841
§ 371 (c)(1),
(2) Date: Oct. 17, 2022

(87) PCT Pub. No.: WO2023/224615
PCT Pub. Date: Nov. 23, 2023

(65) Prior Publication Data
US 2023/0373256 A1    Nov. 23, 2023

(51) Int. Cl.
*B60C 29/00* (2006.01)
*F16K 11/07* (2006.01)
*F16K 15/20* (2006.01)

(52) U.S. Cl.
CPC .......... *B60C 29/002* (2013.01); *B60C 29/005* (2013.01); *F16K 11/07* (2013.01); *F16K 15/20* (2013.01); *Y10T 137/3646* (2015.04)

(58) Field of Classification Search
CPC ......... Y10T 137/3786; Y10T 137/3646; F16K 15/20; F16K 15/207; B60C 29/002
See application file for complete search history.

(56) References Cited

U.S. PATENT DOCUMENTS

| | | | | |
|---|---|---|---|---|
| 1,369,343 A * | 2/1921 | Lamb | ...................... | F16K 15/20 137/226 |
| 1,534,862 A * | 4/1925 | Myers | ...................... | F16K 15/20 137/234.5 |
| 1,724,063 A * | 8/1929 | Anderson | ............. | B60C 29/068 137/225 |
| 1,741,198 A * | 12/1929 | Mckenna | ................. | F16K 15/20 137/226 |
| 1,917,499 A * | 7/1933 | Conrad | .................... | F16K 15/20 137/234.5 |
| 2,606,570 A * | 8/1952 | Buenik | ................... | F16K 15/20 137/226 |
| 5,778,923 A * | 7/1998 | Marston | ................ | F16K 15/207 137/228 |
| 2004/0123900 A1* | 7/2004 | Rogier | ...................... | B63C 9/24 137/226 |
| 2007/0246099 A1* | 10/2007 | Yamamoto | ............ | B60C 29/002 137/234.5 |

* cited by examiner

*Primary Examiner* — Robert K Arundale
(74) *Attorney, Agent, or Firm* — Stanzione & Associates, PLLC; Patrick Stanzione

(57) ABSTRACT

A pressure sensitive valve core usable within a valve stem of an inflatable or pressurized apparatus and configured to automatically maintain a manufacturer's recommended air pressure within the inflatable or pressurized apparatus throughout fluctuations in temperature and elevation, and to regulate the amount of air pressure being put into the inflatable or pressurized apparatus according to a manufacturer's recommended air pressure. The pressure sensitive valve core includes a body and a spring valve mechanism including a spring designed according to Hook's Law to automatically close the spring valve mechanism against the body when a predetermined amount of pounds per square inch (PSI) is inserted into the inflatable or pressurized apparatus.

20 Claims, 10 Drawing Sheets

FIG. 1
(Conventional)
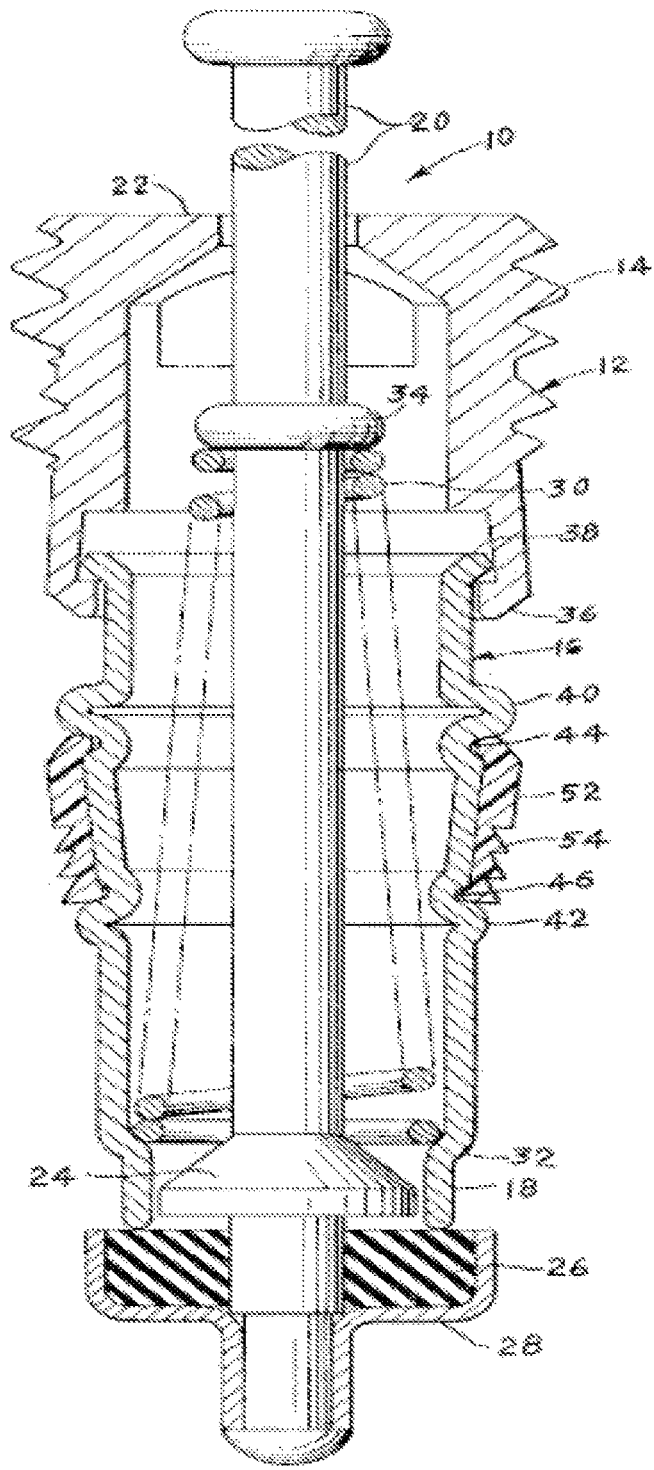

FIG. 2
(Conventional)
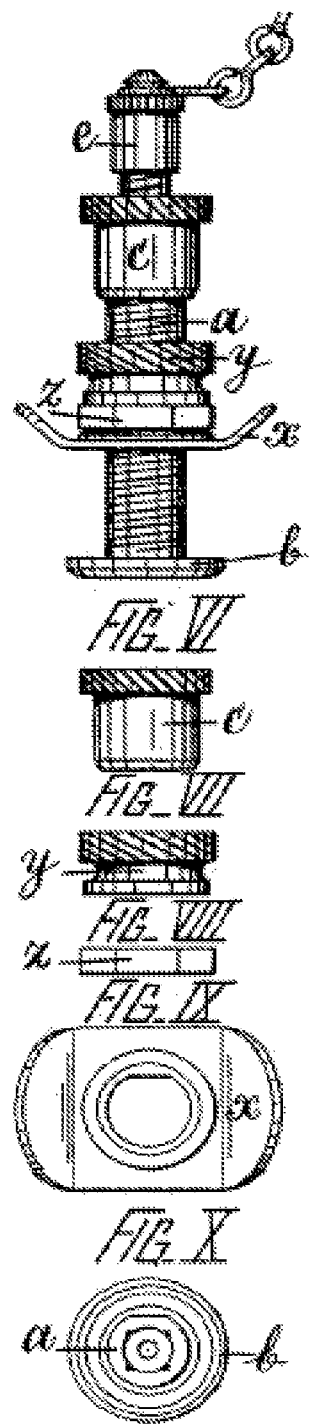

PRESSURE SENSITIVE VALVE CORE

STATEMENT REGARDING FEDERALLY SPONSORED RESEARCH OR DEVELOPMENT

Not applicable.

COPYRIGHT NOTICE

A portion of this disclosure contains material which may be subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTIVE CONCEPT

1. Field of the Invention

The present inventive concept relates to a pressure sensitive valve core. More particularly, but not exclusively, the present inventive concept relates to a pressure sensitive valve core that can automatically maintain a manufacturer's recommended air pressure within a tire (or other inflatable and pressurized devices) throughout fluctuations in temperature and elevation, and a pressure sensitive valve core that can regulate the amount of air pressure being put into tires according to a manufacturer's recommended air pressure.

2. Description of the Related Art

Tires and other inflatable and pressurized devices are generally inflated or pressurized with an air chuck connected to an airline fed by an air compressor. Conventionally, in order to determine how much air is being pumped into a tire (or other inflatable or pressurized device), one must temporarily stop inflating the tire and apply a pressure gauge to a valve stem. The pressure gauge will cause the valve stem to release air in the tire, which allows the pressure gauge to read how much pressure is presently in the tire. This process is time consuming and can be frustrating to inflate the tire to the correct amount of pressure. Further, most people do not carry around a pressure gauge, thus preventing one from knowing how much pressure has been placed into the tire when the tire needs to be inflated.

When tires are over-inflated the additional pressure put into the tires can cause the tires to explode, and can also cause uneven tread wear or premature wear of the tires. Further, under-inflation of tires can cause uneven wear on the tires as well as inefficient use of fuel for motorized vehicles using such tires.

U.S. Pat. No. 3,712,328 by McAnally discloses a tire valve core 12 which controls the flow of air pressure through the core 12 by simply opening and closing. More specifically, when a pin 20 is pressed downward a sealing washer 26 is pushed away from an opening at the bottom of the core to allow air pressure to pass through. When the pin 20 is no longer being pressed a spring 30 forces the pin 20 to move back upward, resulting is the return of the sealing washer 26 to block the opening at the bottom of the core 12. This invention cannot regulate the pressure that is put into a tire in which the tire valve core 12 is connected.

U.S. Pat. No. 582,460 by Cottrell & Dixon discloses a valve core and stem combination where the valve core is exposed at a top of the stem and threads into the stem to close the valve. In other words, the valve core in this invention works as a cap to close the valve stem. When the valve core is open air can transfer through the valve and when the valve core is closed air cannot transfer through the valve. This invention cannot regulate a maximum or minimum amount of air pressure within a tire, and one must rely on a pressure gauge to determine the air pressure within a tire.

Accordingly, there is a need for a pressure sensitive valve core usable with a valve stem of a tire or other inflatable device which can automatically maintain a required pressure within a tire throughout fluctuations in temperature and elevation, and can regulate a maximum and a minimum amount of inflation put into tires and other inflatable devices.

SUMMARY OF THE INVENTIVE CONCEPT

The present general inventive concept provides a pressure sensitive valve core that can automatically maintain a manufacturer's recommended air pressure within a tire (or other inflatable devices) throughout fluctuations in temperature and elevation, and can regulate the amount of air pressure being put into tires according to a manufacturer's recommended air pressure.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a pressure sensitive valve core usable with a valve stem to force air pressure into an inflatable device attached to the valve stem, comprising: a hollow valve core body including external threads to thread into a valve stem, internal top threads disposed at a top opening thereof and internal bottom threads disposed at a bottom opening thereof; a valve core top including an air chuck port extending through a center thereof, an air chuck press column having an air chuck press extending from a top side thereof directly above the air chuck port, a valve core top insert extending from a bottom side thereof and including external threads to be threaded to the internal to threads of the valve core body, and an air chuck regulator fixed therein and including at least one air regulator port and a central hole therethrough; a spring mechanism housing and lock combination including a threaded insert top including external threads to be threaded with the internal bottom threads of the valve core body, a bottom hole and a valve mechanism fixed to internal sidewalls thereof, the valve mechanism including at least one port hole for air to pass through, a central hole including a male c-clip axially fixed at a first side of the central hole and an insert axially aligned with and extending from a second side of the central hole; a spring valve mechanism including: a seat disposed along a circumference thereof facing a first direction; a circular collar extending from the seat; and a spring valve slide extending outward from a center thereof, the spring valve slide extending through a center thereof and including: an air pressure check port extending axially therethrough; a female c-clip locking groove disposed around the outer surface of the spring valve slide at a position to align with and become engaged with the male c-clip when the spring valve slide is inserted through the bottom hole of the spring mechanism housing and lock combination, through the central hole and through the insert of the valve mechanism, and when the seat thereof is in pressing contact with the bottom hole of the spring mechanism housing and lock combination; and a spring disposed around the spring valve slide and configured to apply a spring tension between the spring valve mechanism and the valve mechanism insert; and an air pressure check tube having first and second ends thereof and an axial hole extending through the first end and terminating at the second end, the air pressure check tube extending through the air chuck press column, through the central hole of the air chuck regulator and through the air pressure check port of the spring valve slide such that the first end thereof extends out of the air chuck press column and the second end rests within the end of the spring valve slide port, the air pressure check tube including: a spring disposed adjacent the first end to limit movement of the air pressure check tube within the pressure sensitive valve core; and an air pressure check valve disposed through a side thereof adjacent the second end thereof and extending to the axial hole such that the air pressure check valve extends out of the air pressure check port of the spring valve slide when pressure is applied to the first end of the air pressure check tube.

In an exemplary embodiment, the air chuck press column can be attached to a circumferential surface of the air chuck port such that air pressure can flow between the air chuck press column and the air chuck port.

In another exemplary embodiment, one of the spring valve slide port and the air pressure check tube can formed of a metal coated with a nylon material such that an air-tight seal is formed therebetween and the air pressure check tube is enabled to slide within the spring valve slide port.

In another exemplary embodiment, the spring force of the spring disposed around the spring valve slide can be adjustable to equate with a corresponding inflatable device's manufacturer recommended PSI limit using Hook's Law $F_s=-kx$ such that the spring valve mechanism will be forced against the bottom opening of the spring mechanism housing and lock combination when the manufacturer recommended PSI limit of the inflatable device equals the force of the spring disposed around the spring valve slide.

In still another exemplary embodiment, the spring disposed around the spring valve slide is formed of one of a Haynes 25 alloy or an Elgiloy alloy.

In still another exemplary embodiment, the air pressure check tube can include a first air gauge spring stop disposed adjacent the first end to limit movement of the air pressure check tube spring thereon; and the air chuck press column can include a second air gauge spring stop formed within the air chuck press column port to limit a distance in which the air pressure check tube spring can be inserted therein.

In yet another exemplary embodiment, the air pressure check tube can include a stop disposed at the second end thereof which has a larger diameter than the air pressure check port of the spring valve slide such that the air pressure tube stop is prevented from sliding upward through the air pressure check port.

In yet another exemplary embodiment, the valve core top includes at least one bleed-off valve extending through outer edges thereof to release air from valve core body when the pressure sensitive valve core is in a closed state.

The foregoing and/or other features and utilities of the present general inventive concept may also be achieved by providing a pressure sensitive valve core usable within a valve stem connected to an inflatable device, comprising: a body including: an upper portion having an air chuck port extending through a top center thereof, an air chuck press column having an air chuck press at a first end and extending directly above the air chuck port at a second end, and an air chuck regulator fixed along an inner wall thereof and including at least one air regulator port and a central hole therethrough; a middle portion including external threads to thread into a valve stem; a lower portion including bottom opening and a valve mechanism fixed along an inner wall thereof, the valve mechanism including at least one port hole formed therethrough to allow passage of air, a central hole including a male c-clip axially fixed at a first side of the central hole and an insert axially aligned with and extending from a second side of the central hole; a spring valve mechanism including: a seat disposed along a circumference thereof facing along a first side thereof; and a spring valve slide extending from a bottom of the spring valve mechanism outward from the first side thereof and comprising: an air pressure check port extending axially along a length thereof; a female c-clip locking groove disposed around an outer surface thereof at a position to align with and become engaged with the male c-clip when the spring valve slide is inserted through the bottom opening of the lower portion of the core body, through the central hole and through the insert of the valve mechanism, and when the seat thereof is in pressing contact with the bottom opening of the lower portion of the core body; and a spring disposed around the spring valve slide and configured to apply a spring tension between the spring valve mechanism and the valve mechanism insert; and an air pressure check tube having first and second ends and an axial hole extending through the first end and terminating at the second end, the air pressure check tube extending through the air chuck press column, through the central hole of the air chuck regulator and through the air pressure check port of the spring valve slide such that the first end thereof extends out of the air chuck press column and the second end extends out of the air pressure check port of the spring valve slide, the air pressure check tube including: a spring disposed adjacent the first end to limit movement of the air pressure check tube within the pressure sensitive valve core; and an air pressure check valve disposed through a side adjacent the second end thereof and in contact with the axial hole such that the air pressure check valve extends out of the air pressure check port of the spring valve slide when pressure is applied to the first end of the air pressure check tube.

In an exemplary embodiment, the air chuck press column is attached to a circumferential surface of the air chuck port such that air pressure can flow between the air chuck press column and the air chuck port.

In another exemplary embodiment, the spring tension force of the spring disposed around the spring valve slide is formed to equate with an inflatable device's manufacturer recommended PSI limit using Hook's Law $F_s=-kx$ such that the spring valve mechanism will be forced against the bottom opening of the lower portion of the core body when the manufacturer recommended PSI limit of the inflatable device equals the tension force of the spring disposed around the spring valve slide.

In still another exemplary embodiment, the body is a single body formed by injection molding.

In still another exemplary embodiment, the body is a single body formed of a 3D printing mold.

In still another exemplary embodiment, the air pressure check tube can include a first air gauge spring stop disposed adjacent the first end to limit movement of the air pressure check tube spring thereon; and the air chuck press column can include a second air gauge spring stop formed within the air chuck press column port to limit a distance in which the air pressure check tube spring can be inserted therein.

In still another exemplary embodiment, the air pressure check tube can include a stop disposed at the second end thereof which has a larger diameter than the air pressure check port of the spring valve slide such that the air pressure tube stop is prevented from sliding upward through the air pressure check port.

The foregoing and/or other features and utilities of the present general inventive concept may also be achieved by providing a pressure sensitive valve core usable within a valve stem connected to an inflatable device, comprising: a body having a chuck port disposed at a top portion thereof, an air chuck press column extending directly above the air chuck port, external threads formed along an outer surface to thread into a valve stem, and an opening disposed at a bottom portion: an air chuck regulator fixed along an inner wall of the body within the top portion and including at least one air regulator port and a central hole therethrough; a valve mechanism fixed along an inner wall of the lower portion of the body, the valve mechanism including at least one port hole formed therethrough to allow passage of air, a central hole including a male c-clip axially fixed at a first side of the central hole and an insert axially aligned with and extending from a second side of the central hole; a spring valve mechanism including: a seat disposed along a circumference of a first side thereof; and a spring valve slide extending from a bottom of the spring valve mechanism outward in the direction of the first side thereof and comprising: an air pressure check port extending axially along a length thereof; a female c-clip locking groove disposed around an outer surface thereof at a position to align with and become engaged with the male c-clip when the spring valve slide is inserted through the bottom opening of the lower portion of the core body, through the central hole and through the insert of the valve mechanism, and when the seat thereof is in pressing contact with the bottom opening of the lower portion of the core body; and a spring disposed around the spring valve slide and configured to apply a spring tension between the spring valve mechanism and the valve mechanism insert; and an air pressure check tube having first and second ends and an axial hole extending through the first end and terminating at the second end, the air pressure check tube extending through the air chuck press column, through the central hole of the air chuck regulator and through the air pressure check port of the spring valve slide such that the first end thereof extends out of the air chuck press column and the second end past the air pressure check port of the spring valve slide, the air pressure check tube including: a spring disposed adjacent the first end to limit movement of the air pressure check tube within the pressure sensitive valve core; and an air pressure check valve disposed through a side adjacent the second end thereof such that the air pressure check valve extends out of the air pressure check port of the spring valve slide when pressure is applied to the first end of the air pressure check tube.

In an exemplary embodiment, the body can be a single body formed by injection molding.

In another exemplary embodiment, the body is a single body formed of a 3D printing mold.

In still another exemplary embodiment, the air pressure check tube includes a first air gauge spring stop disposed adjacent the first end to limit movement of the air pressure check tube spring thereon; and the air chuck press column includes a second air gauge spring stop formed within the air chuck press column port to limit a distance in which the air pressure check tube spring can be inserted therein.

In still another exemplary embodiment, the air pressure check tube includes a stop disposed at the second end thereof which has a larger diameter than the air pressure check port of the spring valve slide such that the air pressure tube stop is prevented from sliding upward through the air pressure check port.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 1 illustrates a conventional tire valve core;

FIG. 2 illustrates another conventional tire valve core;

Figure 3A:
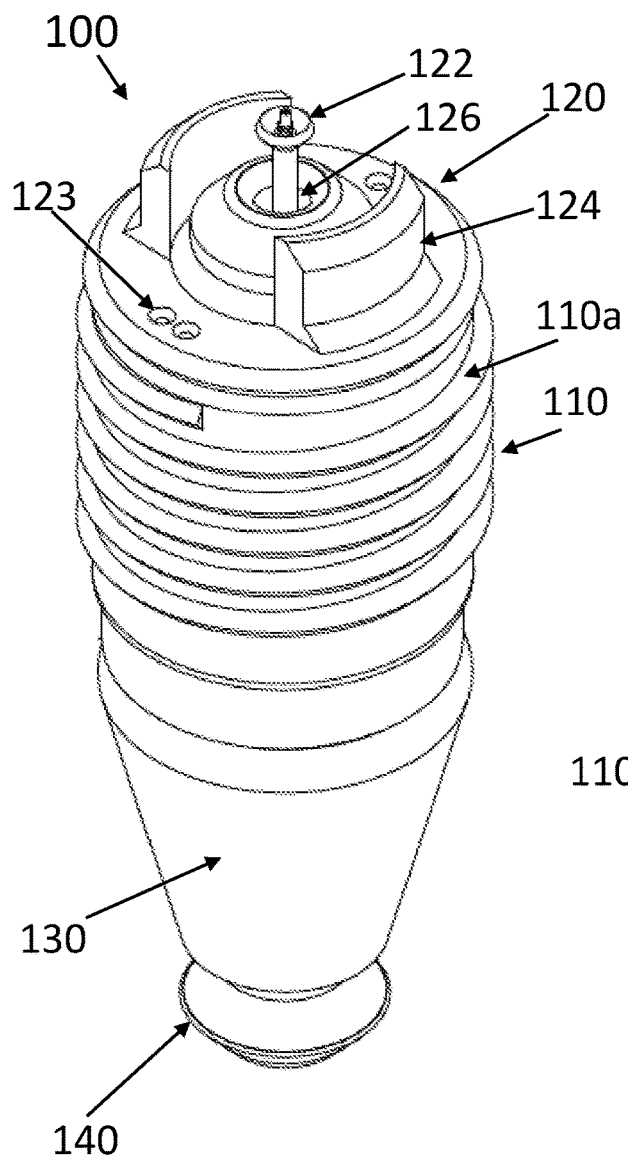
FIG. 3A illustrates perspective view of a pressure sensitive valve core according to an example embodiment of the present inventive concept.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of example embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept may be omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description herein. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit to process at least one function or operation, wherein the unit and the block may be embodied as hardware or software or embodied by combining hardware and software.

Hereinafter, one or more exemplary embodiments of the present general inventive concept will be described in detail with reference to accompanying drawings.

Example embodiments of the present general inventive concept are directed to a pressure sensitive valve core that can automatically maintain a required pressure within a tire throughout fluctuations in temperature and elevation.

Figure 3B:
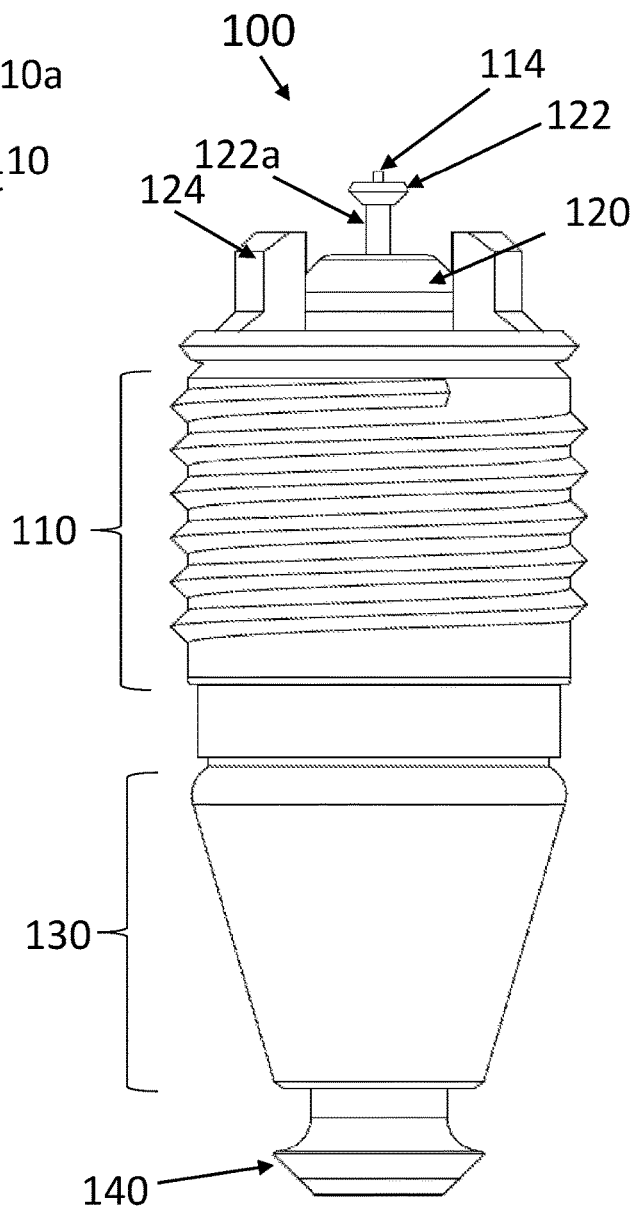
FIG. 3B illustrates a side view of the pressure sensitive valve core according to an example embodiment of FIG. 3A.
Figure 9:
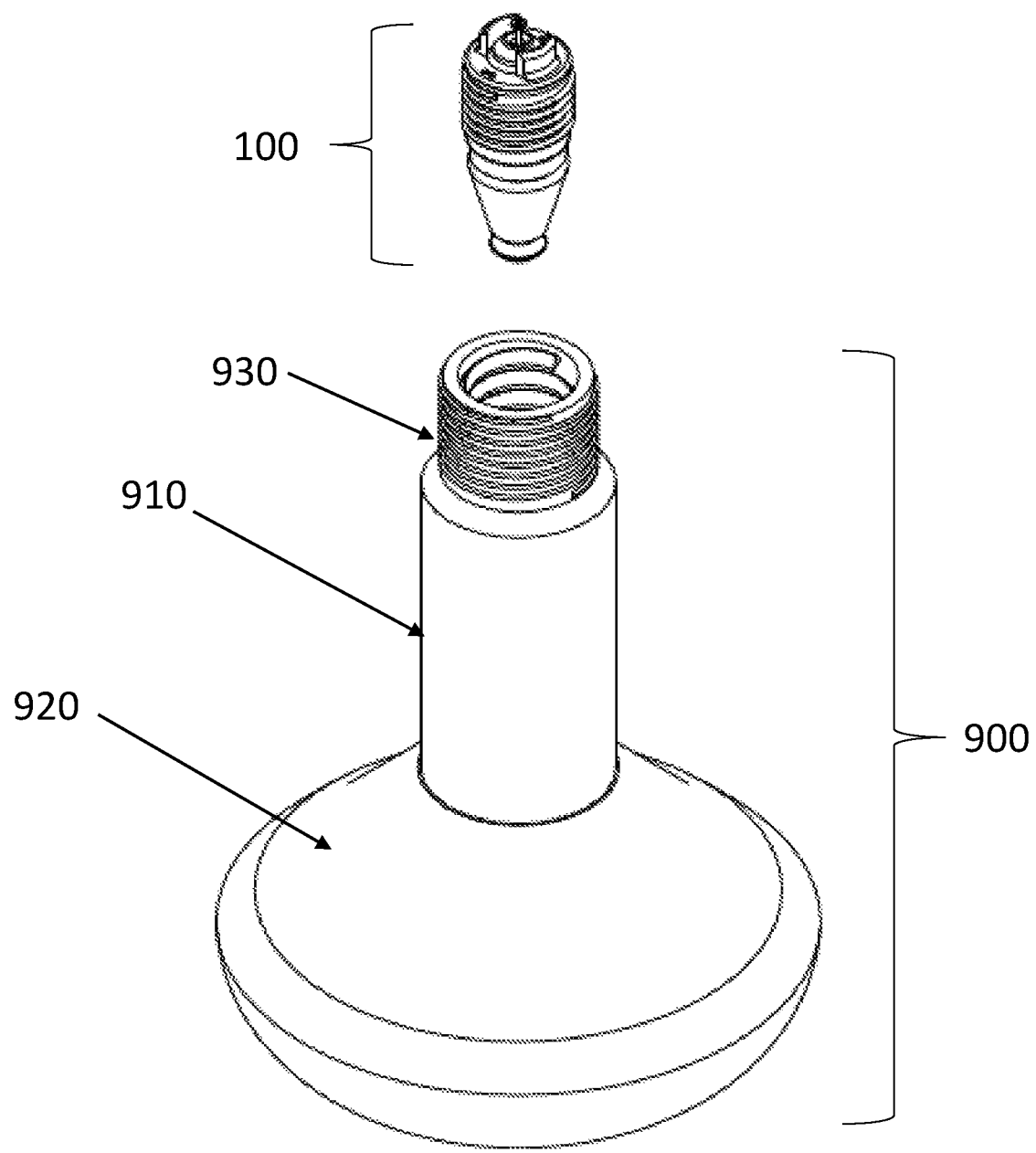
FIG. 9 illustrates a side view of the pressure sensitive valve core according to the example embodiment of FIG. 3A as being applied to a universal valve stem.

FIG. 3A illustrates a perspective view of a pressure sensitive valve core 100 according to an example embodiment of the present inventive concept. FIG. 3B illustrates a side view of the pressure sensitive valve core 100 according to the example embodiment of FIG. 3A. Referring to FIGS. 3A and 3B, the pressure sensitive valve core 100 according to this example embodiment is configured to be threaded into a universal valve stem, such as the universal valve stem 900 illustrated in FIG. 9. The pressure sensitive valve core 100 according to the example embodiment of FIGS. 3A and 3B is configured to provide an air-tight seal with the universal valve stem 900 when threaded thereto. However, the pressure sensitive valve core 100 can be threaded into any type of valve stem that is attached to a device to be inflated or pressurized, such as, for example, a tire tube, a tubeless tire, a fire extinguisher, hydraulic systems, etc. In other words, the pressure sensitive valve core 100 according to the example embodiment of FIGS. 3A and 3B is configured to be interchangeable with all types of valve stems and to regulate manufacturer's suggested maximum and minimum air pressure therein.

The pressure sensitive valve core 100 according to FIGS. 3A and 3B can include a valve core body 110, a valve core top 120 which can be threaded to a top portion of the valve core body 110, a spring mechanism housing and lock combination 130 which can be threaded to a bottom portion of the valve core body 110, and a spring valve mechanism 140 which can be disposed at a bottom end of the spring mechanism housing and lock combination 130. The spring valve mechanism 140 can extend partly into a bottom circular opening 130b of the spring mechanism housing and lock combination 130. According to an example embodiment, the valve core top 120, the valve body 110 and the spring mechanism housing and lock combination 130 can be manufactured from materials such as nickel-plated brass, rubber, cobalt, titanium, selected stainless steels, or any other materials which will provide the intended purposes as described herein, which include providing longevity, weather resistance, durability and the ability to provide an air-tight seal therebetween. Alternatively, the valve core top 120, the valve body 110 and the spring mechanism housing and lock combination 130 can be manufactured by processes such as 3D printer technology or injection molding.

Figure 4A:
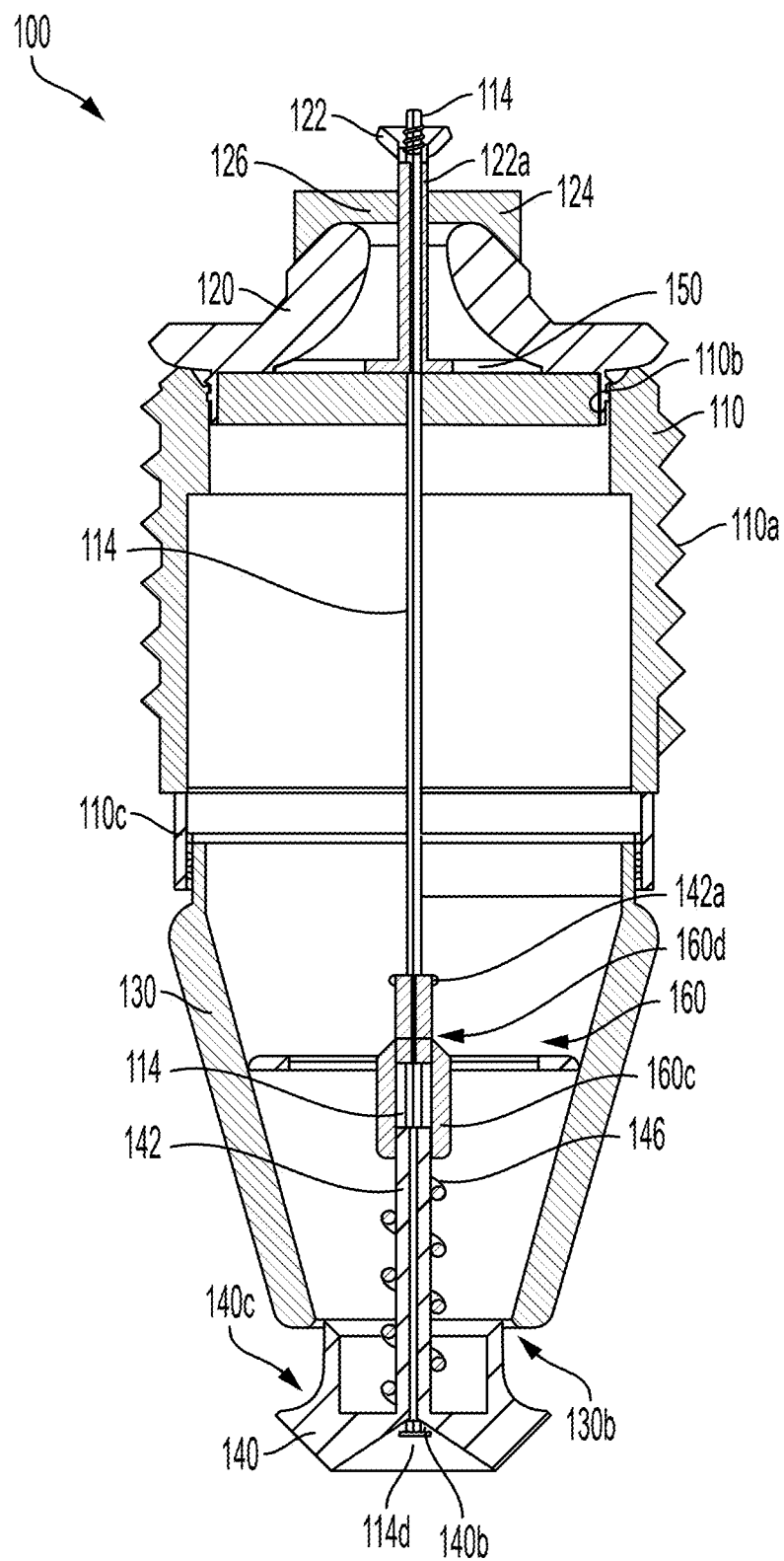
FIG. 4A illustrates a cross-sectional view of the pressure sensitive valve core according to an example embodiment of FIG. 3A in an open position.
Figure 4B:
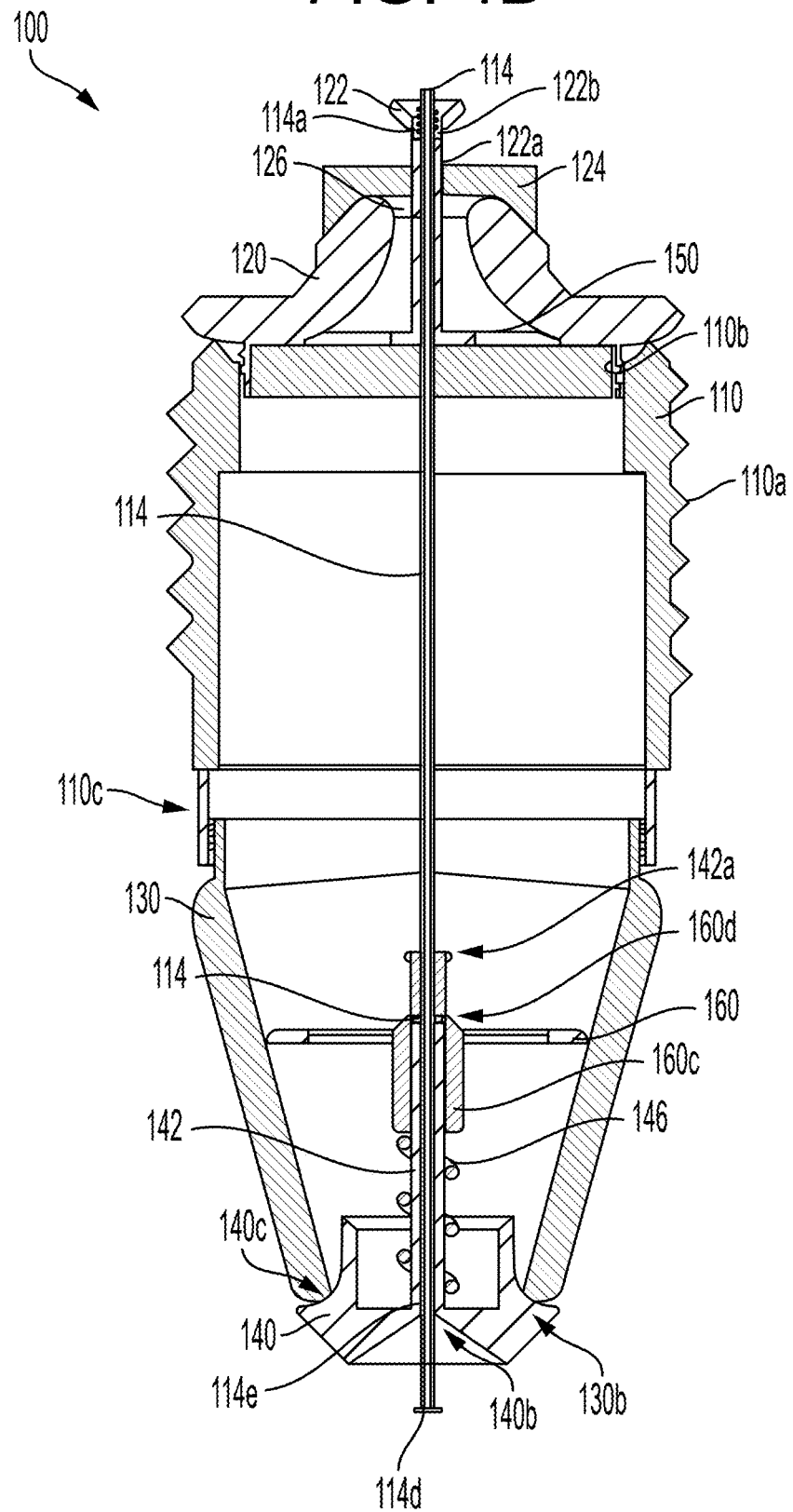
FIG. 4B illustrates a cross-sectional view of the pressure sensitive valve core according to an example embodiment of FIG. 3A in a closed position.

FIG. 4A illustrates a cross sectional view of the pressure sensitive valve core according to an example embodiment of FIG. 3A in an open position, and FIG. 4B illustrates a cross-sectional view of the pressure sensitive valve core according to an example embodiment of FIG. 3A in a closed position.

Referring to FIGS. 4A-4B and 5A-5B, the valve core top 120 can include an air chuck port 126 extending through a center portion thereof. Also provided can be at least two cutaway tool tops 124 extending upward from the valve core top 120 and surrounding the air chuck port 126. Preferably the at least two cutaway tool tops 124 are disposed opposite each other on an upper side of the valve core top 120. The cutaway tool tops 124 are provided to receive a female configured tool which can be placed over the cutaway tool tops 124 to grip and thread the pressure sensitive valve core 100 into a universal valve stem, such as the universal valve stem illustrated in FIG. 9.

Figure 5A:
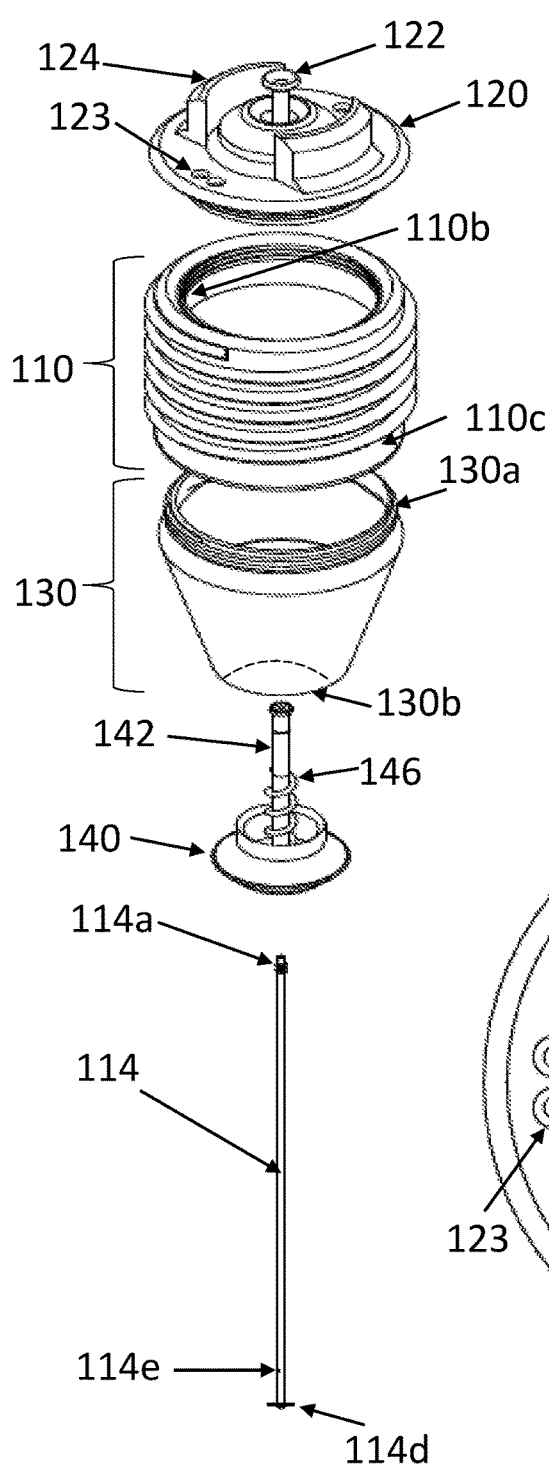
FIG. 5A illustrates an exploded view of the pressure sensitive valve core according to an example embodiment of FIG. 3A.
Figure 5B:
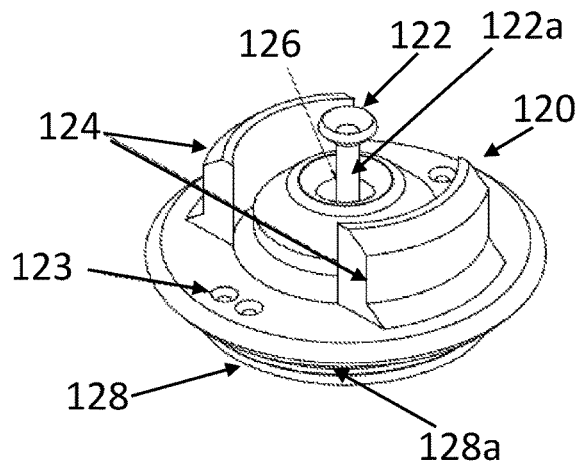
FIG. 5B illustrates a top of the pressure sensitive valve core according to an example embodiment of FIG. 3A.
Figure 5C:
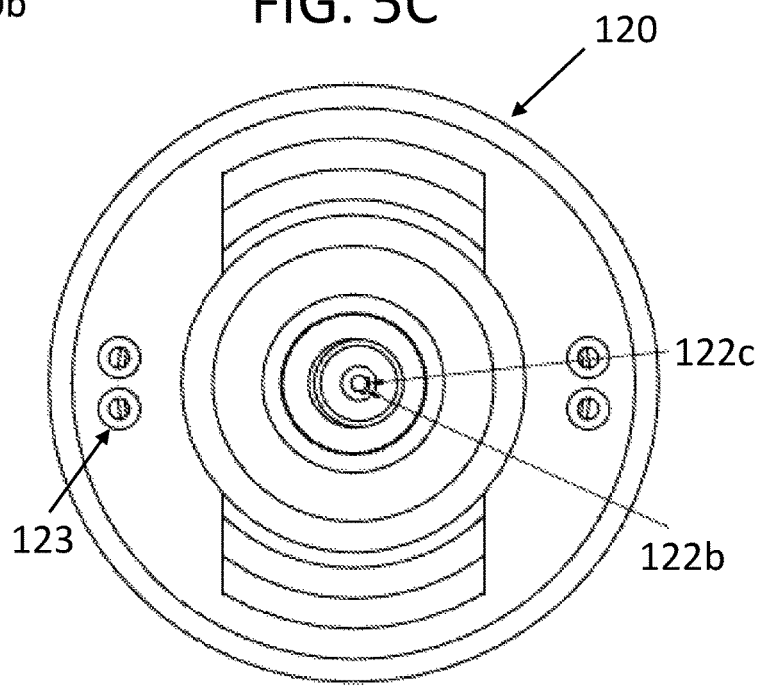
FIG. 5C illustrates a top view of the pressure sensitive valve core according to an example embodiment of FIG. 3A.

As illustrated in FIG. 5B, the valve core top 120 can also include a valve core top insert 128 formed at a bottom portion thereof to be inserted into an opening in the top of the valve core body 110. More specifically, the valve core top insert 128 can include external threads 128a formed circumferentially around an outer portion thereof to be threaded into internal threads 110b formed circumferentially within the inner top portion of the valve core body 110. The external threads 128a and the internal threads 110b are configured to form an air-tight seal therebetween. An example of providing an air-tight seal is to form one of the parts from a rubber material and to form the other one of the parts from a metal material. However, the valve core top 120 and the valve core body 110 can be formed of alternative materials which will ensure an air-tight seal therebetween when threaded together, such as for example, plastic and silicon.

The valve core top 120 can also include an air chuck press 122 disposed at a distal end of an air chuck press column 122a, which can be attached to an inner circumferential surface of the air chuck port 126, as described in more detail below. The valve core top 120 can also include at least one bleed-off valve 123 disposed therethrough, and preferrable a set of two pairs of bleed-off valves 123, which are described in more detail below.

Figure 6A:
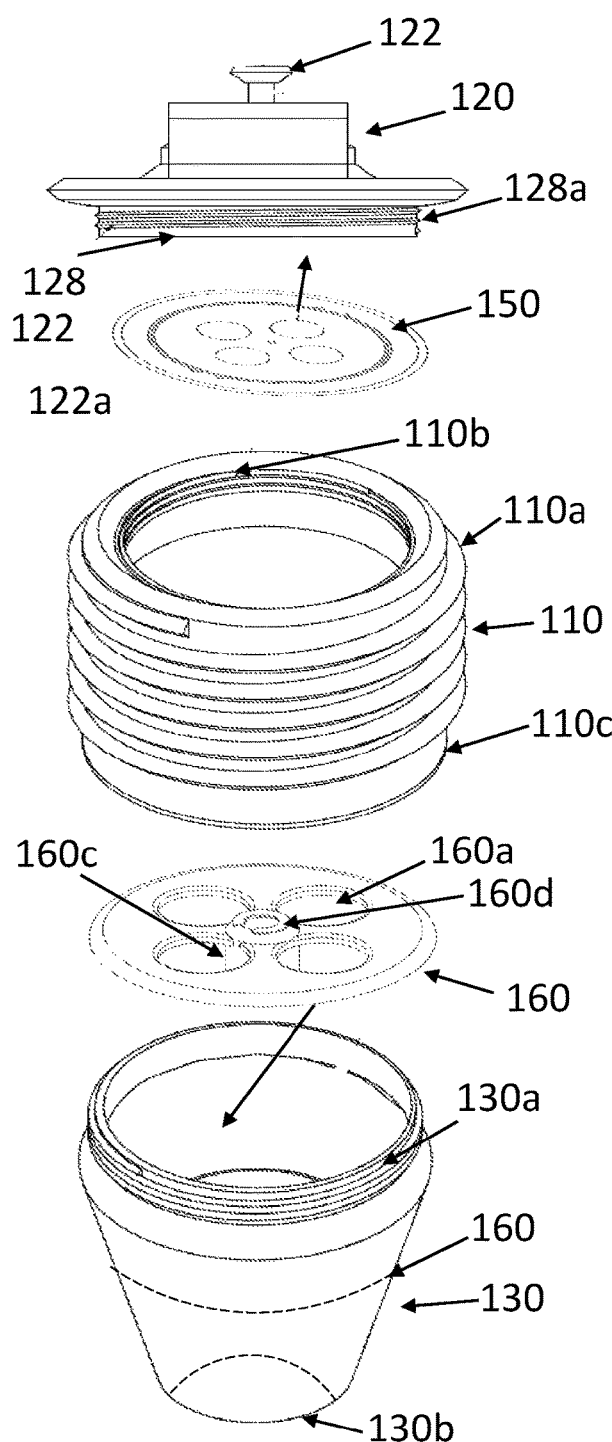
FIG. 6A illustrates an exploded view of the outer sections of the pressure sensitive valve core according to an example embodiment of FIG. 3A.
Figure 6B:
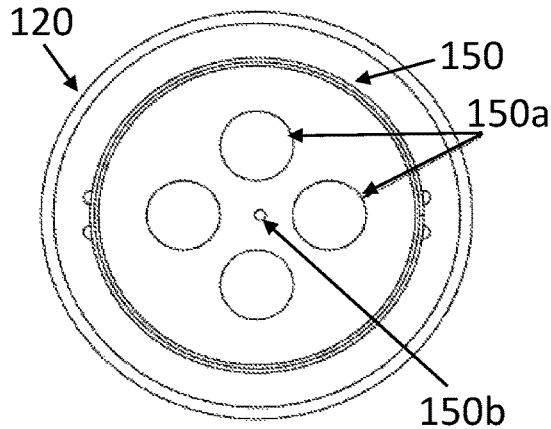
FIG. 6B illustrates a top view of an air chuck regulator according to an example embodiment of the present inventive concept.

Referring to FIGS. 6A and 6B, an air chuck regulator 150 can be fixedly inserted within the valve core top insert 128. The air chuck regulator 150 can include at least one air chuck regulator port 150a to allow pressurized air to flow from the air chuck port 126 of the valve core top 120 into the valve core body 110. Preferable the air chuck regulator 150 includes four air chuck regulator ports 150a disposed around an inner section of the air chuck regulator 150 to allow a substantial amount of air flow therethrough, as illustrated in FIG. 6B. However, any number of air chuck regulator ports 150a can be provided which will perform the intended purposes of permitting sufficient air to flow through the air chuck regulator 150. The air chuck regulator 150 can also include an air chuck regulator central hole 150b to receive an air pressure check tube 114 therethrough, as illustrated in FIG. 4A. The air pressure check tube 114 is preferably an elongated tubular member which is described in more detail below with reference to FIGS. 4A, 5A and 8. According to an example embodiment the air pressure check tube 114 can be made from a metal or metal alloy, brass, music metal or stainless steel, or any other material which will resist corrosion and provide a seal, as described in more detail below. Other alternative materials in which the air pressure check tube 114 can be form of can include Haynes 25 or Elgiloy, which would be specifically useful when nitrogen is used as pressurized air since Elgiloy resists nitrogen embrittlement, and can easily be coated with nylon or rubber.

As described above, the valve core top 120 can further include an air chuck press column 122a. According to an example embodiment, the air chuck press column 122a can be connected with spoke-like connectors at a first end to an inner circumferential surface of the air chuck port 126 such that air can pass through the air chuck port 126 between the connectors connecting the inner circumferential surface of the air chuck port 126 and the air chuck press column 122a. The air chuck press column 122a can be configured to include an air chuck press 122 disposed at a distal end thereof opposite to the end which is connected to the inner circumferential surface of the air chuck port 126. The air chuck press 122 is preferably fixed to the inner circumferential surface of the air chuck port 126 such that when an air chuck (not illustrated) or other pressurized air supply source nozzle is pressed over the air chuck press 122 a button disposed at a center of the air chuck (or other air supply source nozzle) will be pressed inward by the air chuck press 122 to release pressurized air being pumped from an air pump to the air chuck. Once the pressurized air is released from the air chuck the pressurized air will be forced through the air chuck port 126 and through the pressure sensitive valve core body 110.

Referring to FIGS. 4A, 5A, 6A and 6B, the spring mechanism housing and lock combination 130 can include a spring mechanism housing threaded insert top 130a which can be threaded into a bottom of the valve core body 110. More specifically, the valve core body 110 can include a valve body threaded bottom 110c, wherein threads are formed around an inner surface of the valve body threaded bottom 110c. The threads formed in the threaded bottom 110c of the valve core body 110 and the threads formed in the spring mechanism housing threaded insert top 130a are configured to form an air-tight seal therebetween. The spring mechanism housing and lock combination 130 can also include a circular valve mechanism 160 formed therein. More specifically, the circular valve mechanism 160 can be fixed circumferentially along an inner wall thereof at approximately a middle section, as illustrated in FIGS. 4A-4B, 6A and 6C. The valve mechanism 160 can include at least one valve mechanism port 160a formed at an inner portion thereof, and preferrable the valve mechanism 160 can include four valve mechanism ports 160a disposed in a circular formation around the inner portion thereof, as illustrated in detail in FIG. 6C. However, any number of valve mechanism ports 160a can be provided through the valve mechanism 160 which will provide the intended purposes as described herein, which included enabling a sufficient amount of pressurized air to flow through the spring mechanism housing and lock combination 130.

The valve mechanism 160 can also include a valve mechanism central hole 160b formed therethrough and a valve mechanism insert 160c extending downward from the valve mechanism central hole 160b to receive the air pressure check tube 114 therethrough, as well as to receive a spring valve slide 142 therethrough, which is described in more detail below with reference to FIGS. 4A-4B, 5A, 7A and 7B. The valve mechanism 160 can also include a male c-clip lock 160d which can be flexibly fixed to an upper surface thereof and axially aligned with the valve mechanism central hole 160b such that the spring valve slide 142 can extend through both the hole 160b and the male c-clip lock 160d. The male c-clip lock 160d is configured to flexibly expand enough to engage with and disengage with a female c-clip locking groove 142c formed circumferentially around the spring valve slide 142 when a predetermined amount of air pressure is applied thereto, as described in more detail below.

The spring mechanism housing and lock combination 130 can also be configured to include a bottom circular opening 130b formed therein, which will be described in more detail below with reference to FIGS. 4A-4B, 5A, 7A and 7B.

Referring to FIGS. 4A-4B, 5A, 7A and 7B, a spring valve mechanism 140 is provided to open and seal closed the pressure sensitive valve core 100 with respect to an inflatable device or other pressurized apparatus having a valve stem (see FIG. 9) connected thereto in which the pressure sensitive valve core 110 is inserted in a seal-tight manner. More specifically, the spring valve mechanism 140 can include a circular collar 140a extending therefrom, an opening 140b formed through the bottom thereof, and a seat 140c formed therearound which tapers inward and upward toward the circular collar 140a. The opening 140b is preferrable formed to have a circumference to frictionally receive the air pressure check tube 114 therethrough while preventing an air pressure tube stop 114d from sliding therethrough (see FIG. 4A and FIG. 8A), as described in more detail below. The seat 140c is configured to create an air-tight seal with the bottom circular opening 130b of the spring mechanism housing and lock combination 130 when a predetermined amount of pressurized air is forced against the bottom of the spring valve mechanism 140 from within the pressurized tire or other inflatable device.

FIG. 4B illustrates the pressure sensitive valve core 100 in the closed position where the seat 140c is in the position to form an air-tight seal with the bottom circular opening 130b of the spring mechanism housing and lock combination 130. The pressurized air within an inflatable device or pressurized device (herein after inflatable device) is applied to the bottom of the spring valve mechanism 140 when the inflatable device, which is connected to a valve stem containing the pressure sensitive valve core 100 therein, receives an amount of air pressure per square inch (PSI) equivalent to a manufacture's preset recommended amount of pressurized air. For example, in a vehicle tire which is manufactured to be pressurized to an amount of 32 PSI, once the tire has been filed to 32 PSI of pressurized air the seat 140c of the spring valve mechanism 140 will be forced up against the bottom circular opening 130b of the spring mechanism housing and lock combination 130.

Figure 7A:
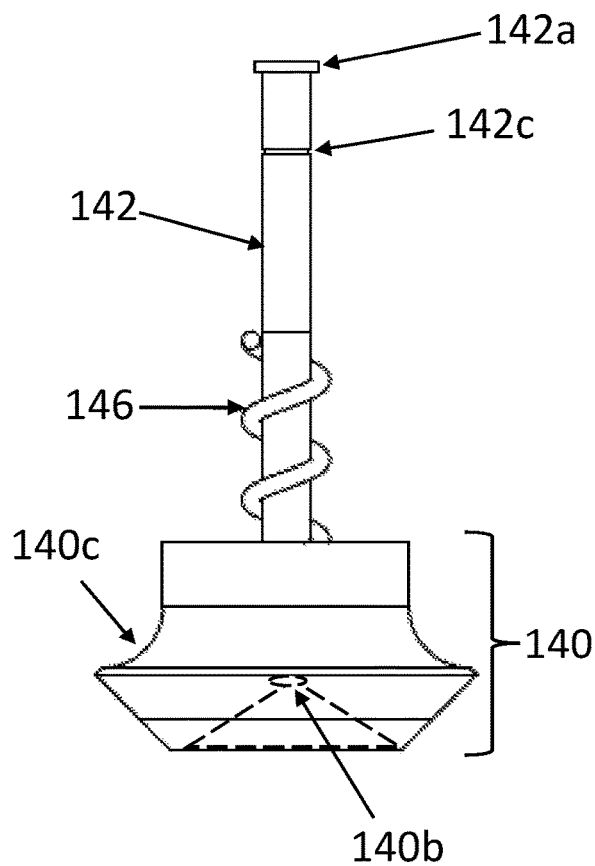
FIG. 7A illustrates a side view of a spring valve mechanism according to an example embodiment of the present inventive concept.
Figure 7B:
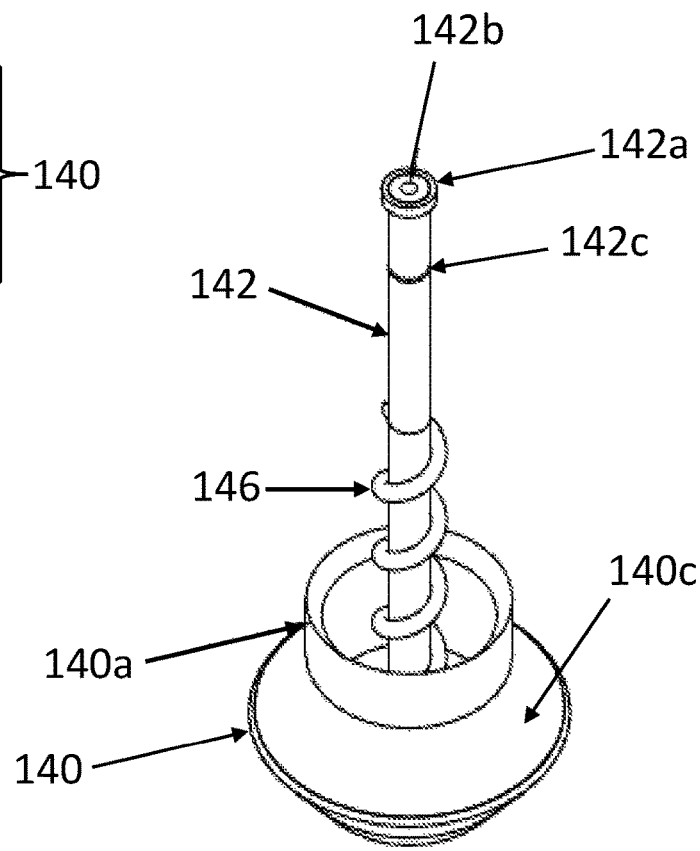
FIG. 7B illustrates a perspective view of the spring valve mechanism according to an example embodiment of FIG. 7A.

Referring to FIGS. 7a and 7B, the spring valve mechanism 140 can also include a spring valve slide 142 which extends from a central portion of an inner bottom portion thereof. The spring valve slide 142 preferably extends upward through the circular collar 140a and in parallel with the circular collar 140a. The spring valve slide 142 preferably includes an air pressure check port 142b extending lengthwise through a center thereof and through the opening 140b formed through the bottom of the spring valve mechanism 140. The spring valve mechanism 140 can be formed of a metal alloy, brass, music metal or stainless steel, or other material which resists rust and becoming oxidized. It is also important that the spring valve side 142 be formed of a material which will provide a smooth sliding internal surface of the air pressure check port 142b with respect to the air pressure check tube 114.

The spring valve slide 142 preferable has a length sufficient to extend partly through the spring mechanism housing and lock combination 130 and through both the valve mechanism central hole 160b and the valve mechanism insert 160c formed in the valve mechanism 160. As pointed out above, the valve mechanism 160 is preferably fixed to the inner circumferential wall of the spring mechanism housing and lock combination 130. The spring valve mechanism 140 and the spring valve slide 142 are provided with the air pressure check port 142b, which extends through the opening 140b formed in the bottom of the spring valve mechanism 140 to form a single continuous air pressure check port 142b extending through the spring valve slide 142 and the spring valve mechanism 140 combination. The air pressure check port 142b and the opening 140b are configured to have the same diameter such that the air pressure check tube 114 can slide therethrough while the air pressure check stop 114d cannot fit therethrough. The air pressure check port 142b is configured to frictionally receive the air pressure check tube 114 therethrough such that air is prevented from flowing between the air pressure check port 142b and the air pressure check tube 114. As pointed out above the air pressure check tube 114 and air pressure check slide 142 can be formed of a metal, such as brass, or stainless steel to resist corrosion and oxidation, while allowing the air pressure check tube 114 to smoothly slide within the air pressure check port 142b. The air pressure check tube 114 can also be formed of Haynes 25 alloy, which it resistant to oxidation and carburization. 122b

As described above, the spring valve slide 142 is inserted through the valve mechanism central hole 160b and the valve mechanism insert 160c such that the spring valve slide 142 can slide back and forth within the valve mechanism central hole 160b and the valve mechanism insert 160c. Diameters of both the valve mechanism central hole 160b and the valve mechanism insert 160c are preferably formed to be slightly larger than a diameter of the spring valve slide 142 such that the spring valve slide 142 can smoothly slide back and forth within the valve mechanism central hole 160b and the valve mechanism insert 160c.

Still referring to FIGS. 4A-4B, 5A, 7A and 7B, a spring slide stop 142a can be formed at an end of the spring valve slide 142 opposite the end which extends from the spring valve mechanism 140. The spring slide stop 142a can prevent the spring valve slide 142 from slipping out of the valve mechanism central hole 160b and the valve mechanism insert 160c. The spring valve slide 142 can also include a Hook's Law spring 146 which can be configured to coil around the spring valve slide 142. The Hook's Law spring 146 is preferably positioned between the spring valve mechanism 140 and the valve mechanism insert 160c, as illustrated in FIGS. 4A and 4B. This spring 146 is manufactured to have a tension/spring force with a pneumatic compression based on Hook's Law: $F_s = -kx$, where $F_s$ is the spring's force, k is the spring constant and x is the spring stretch or compression. The Hook's Law spring 146 force can be pre-manufactured to any specific pneumatic compression which corresponds with a manufacturer's recommended pounds per square inch (PSI) of the tire or any other device being inflated through a corresponding valve stem 900 (see FIG. 9) and pressure sensitive valve core 100 inserted therein. The Hook's Law spring 146 can be made from Referring to FIGS. 7A and 7B, the spring valve slide 142 can also include a female c-clip locking groove 142c formed circumferentially around an upper portion thereof. The female c-clip lock groove 142c is preferably formed at a position along the spring valve slide 142 such that the female c-clip locking groove 142c is positioned directly above the valve mechanism 160 when the spring valve slide 142 is inserted through the valve mechanism central hole 160b and the seat 140c is sealed against the bottom opening 130b of the spring mechanism housing and lock combination 130.

After the spring valve slide 142 is inserted through the valve mechanism insert 160c and the valve mechanism central hole 160b and the male c-clip lock 160d is engaged with the female c-clip lock groove 142c, the air pressure check tube 114 can be inserted through the air chuck press column 122a, through the air chuck regulator central hole 150b, and through the air pressure check port 142b of the spring valve slide 142. The air pressure check tube 114 can be inserted through the air pressure check port 142b to the extent that an air pressure check valve 114e (see FIG. 8) of the air pressure check tube 114 becomes close to the open bottom 140b of the spring valve mechanism 140 but does not extend past the air pressure check port 142a (see FIG. 8A) when the pressure sensitive valve core 110 is in a closed position (see FIG. 4B).

Figure 6C:
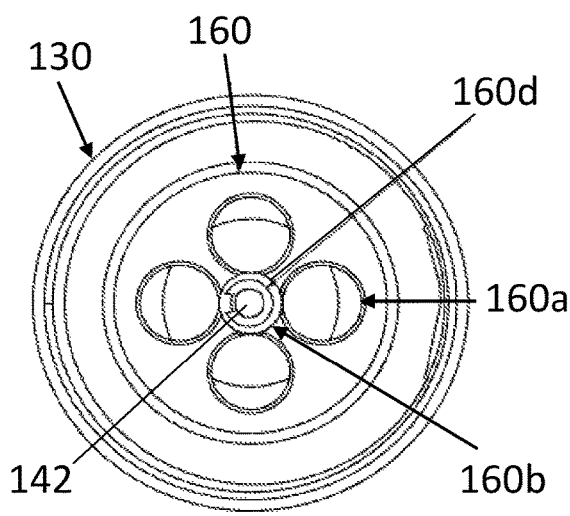
FIG. 6C illustrates a top view of a valve mechanism according to an example embodiment of the present inventive concept.

Referring to FIGS. 4B and 6C, after the male c-clip lock 160d is engaged within the female c-clip locking groove 142c to secure the spring valve mechanism 140 and spring valve slide 142 in place with respect to the valve mechanism 160, the spring valve mechanism seat 140c will be tightly sealed against the bottom circular opening 130b of the spring mechanism housing and lock combination 130. The male c-clip lock 160d will maintain a tight seal between the seat 140c of the spring valve mechanism 140 and the bottom circular opening 130b of the spring mechanism housing and lock combination 130.

Referring to FIGS. 4A-4B and 8A-8B, the air pressure check tube 114 can include a hole 114f extending axially through a center thereof from a top end to a bottom end thereof. At the bottom end of the air pressure check tube 114 can be provided an air pressure check tube stop 114d configured to have a diameter larger than the diameter of the air pressure check tube 114 such that the air pressure check tube stop 114d cannot slide into the spring valve mechanism 140. It is to be noted that the axial hole 114f terminates prior to the air pressure check tube stop 114d such that air flow from an outside environment through the axial hole 114f cannot pass into the inside of an inflatable device in which a valve stem (including the pressure sensitive valve core 100) is connected (see FIG. 9). In other words, air pressure is prevented from flowing through the axial hole 114*f* of the air pressure check tube 114 from outside environment into the inflatable device.

Figure 8A:
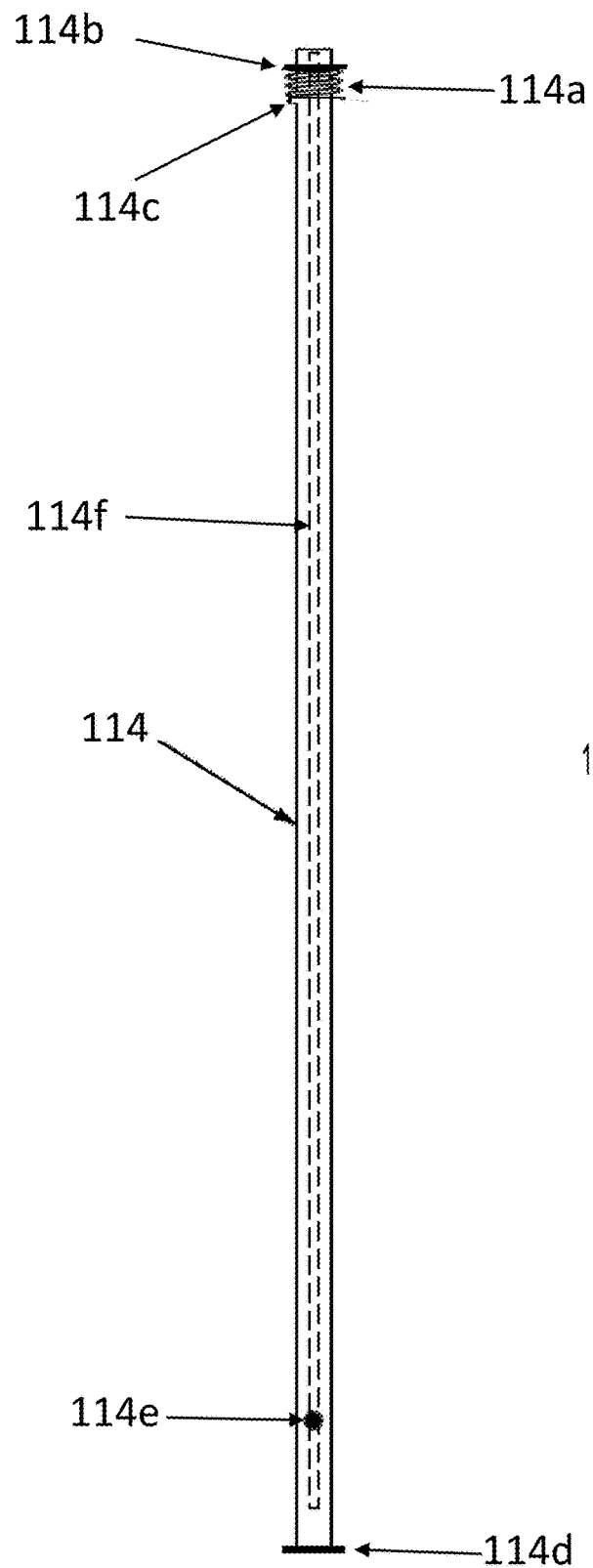
FIG. 8A illustrates a side view of an air pressure check tube according to an example embodiment of the present inventive concept.

Referring to FIG. 8A, adjacent the top end of the air pressure check tube 114 can be provided an air gauge spring 114*a*. Above the spring 114*a* can be provided first air gauge spring stop 114*b* to prevent the spring 114*a* from sliding off the end of the air pressure check tube 114 disposed at the air check press 122.

Figure 8B:
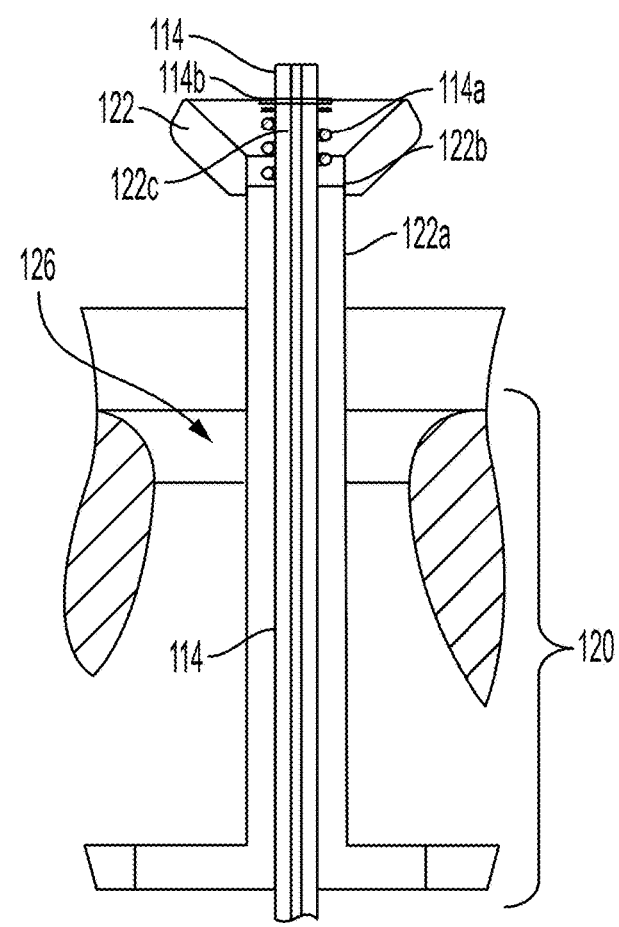
FIG. 8B illustrates a partial cross-sectional view of a valve core top and corresponding column, according to an example embodiment of the present inventive concept.

Referring to FIG. 8B, the air chuck press column 122*a* can include a second air gauge spring stop 122*b* formed circumferentially therein to prevent the spring 114*a* from sliding through the air pressure check column 122*a*, thus limiting the movement of the air pressure check tube 114 within the air pressure check column 122*a* and the pressure sensitive valve core 100.

The air gauge spring 114*a* allows the air pressure check tube 114 to be pressed downward into the air chuck press column 122*a* by a predetermined amount until the spring 114*a* is fully compressed against the second air gauge spring stop 122*b*. The air pressure check tube 114 can also include an air pressure check valve 114*e* disposed through a lower portion of the air pressure check tube 114. The air pressure check valve 114*e* is configured to be connected to the axial hole 114*f* such that air can flow therebetween when the air pressure check valve 114*e* is not blocked by the air pressure check port 142*b*.

When the air pressure check tube 114 is pressed down into the air chuck press column 122*a* and the pressure sensitive valve core 100 is in a closed position (see FIG. 4B), the air pressure check valve 114*e* will slide down along the inner surface of the air pressure check port 142*b* of the spring valve slide 142 and extend slightly past the bottom opening 140*b* of the spring valve mechanism 140. When the air pressure check valve 114*e* extends slightly past the bottom opening 140*b* of the spring valve mechanism 140, pressurized air will be released from within the tire (or other inflatable or pressurized device) through the air pressure check valve 114*e* and up through the axial hole 114*f* into the environment through the top of the air pressure check tube 114.

The air pressure check tube 114 can also include an air pressure tube check block 114*c* disposed directly below the spring stop 114*a*. The air pressure tube check block 114*c* can be configured to protrude from a side of the air pressure check tube 114 and slide along a groove 122*c* formed within the air chuck press column 122*a* while the second air gauge spring stop 122*b* prevents the air pressure check return spring 114*a* from sliding along with the air pressure check tube 114.

Operations of the pressure sensitive valve core 100 according to an example embodiment will now be described below.

Referring to FIGS. 4A and 4B, a fully assembled pressure sensitive valve core 100 will have the valve body 110 threaded to the valve core top 120 such that an air-tight seal is formed between the threads formed on the valve body threaded insert top 110*b* and the threads 128*a* formed on the valve core top insert 128. The bottom of the valve body 110 will be threaded to the spring mechanism housing and lock combination 130 such that an air-tight seal is formed between the threads formed on the valve body threaded bottom 110*c* and the threads formed on the spring mechanism housing threaded insert top 130*a*.

With the valve core top 120, valve body 110 and the spring mechanism housing and lock combination 130 being securely threaded together in an air-tight manner, the spring valve slide 142 will extend upward through the bottom opening 130*b* in the spring mechanism housing and lock combination 130 and through the valve mechanism insert 160*c* and the valve mechanism central hole 160*b* of the valve mechanism 160. The spring valve slide 142 will be fixed in place with respect to the spring valve mechanism 160 by the locking engagement of the male c-clip lock 160*d* to the female c-clip locking groove 142*c* formed around the spring valve slide 142 when the seat 140*c* of the spring valve mechanism 140 is sealed against the bottom opening 130*b* of the spring mechanism housing and lock combination 130.

The male c-clip lock 160*d* is configured to have a predetermined stiffness such that a predetermined amount of pressure applied thereto by a downward force will cause the male c-clip lock 160*d* to flex enough to disengage from the female c-clip locking groove 142*c*. More specifically, when the male c-clip lock 160*d* is lockingly engaged with the female c-clip locking groove 142*c* the spring valve mechanism 140 is positioned to be sealed against the bottom opening 130*b* of the spring mechanism housing and lock combination 130, as illustrated in FIG. 4B. However, as pressurized air is forced (by an air chuck or other pressurized air source) through the air chuck port 126, through the valve body 110, through the air chuck regulator ports 150*a*, and through the spring mechanism housing and lock combination 130 and valve mechanism ports 160*a*, this pressurized air will force the spring valve mechanism 140 downward and away from the bottom opening 130*b* of the spring mechanism housing and lock combination 130. As the spring valve mechanism 140 is forced downward the male c-clip lock 160*d* will disengage from the female c-clip locking groove 142*c*, causing the spring valve mechanism 140 to separate from the bottom opening 130*b* and create a gap, as illustrated in FIG. 4A, for the pressurized air to pass through and fill the tire (or other inflatable or pressurized device), which is connected to a valve stem containing pressure sensitive valve core 100.

Once the tire (or other inflatable or pressurized device) reaches the manufacturer's recommended amount of air pressure (pressure per square inch (PSI)) a back pressure within the tire will become equal in force to the spring's tension/force in the specifically manufactured Hook's Law spring 146. As a result, the air pressure will overcome the spring's tension/force of the Hook's Law spring 146, causing the spring valve mechanism 140 to be forced upward toward the spring mechanism housing and lock combination 130 until the spring valve mechanism seat 140*c* becomes sealed tight against the bottom opening 130*b*, as illustrated in FIG. 4B. At the same time that the spring valve mechanism seat 140*c* becomes sealed tight against the bottom opening 130*b* the female c-clip locking groove 142*c* will re-align with the male c-clip lock 160*d*, thus causing the male c-clip lock 160*d* to re-engage with the female c-clip locking groove 142*c*. The engagement of the male c-clip lock 160*d* with the female c-clip locking groove 142*c* will aid in securing a tight seal between the spring valve mechanism seat 140*c* and the bottom opening 130*b* in the spring mechanism housing and lock combination 130. At this time the seal between the spring valve mechanism seat 140*c* and the bottom opening 130*b* will block the flow of air from escaping from the tire (or other inflatable or pressurized device) and maintain the tire at the manufacturer's recommended amount of air pressure set during manufacturing thereof.

Furthermore, in the case where a tire may experience some loss of air pressure, such as in the case of a leak in the tire or in the case of cold temperatures, the male c-clip lock 160d is configured to be sufficiently rigid to remain engaged with the female c-clip locking groove 142c, thus keeping a tight seal between the spring valve mechanism seat 140c and the bottom opening 130b and preventing the valve from losing pressure at a faster rate.

Referring to FIGS. 5A and 5B, the valve core top 120 can include at least one bleed-off valve 123, and preferably includes two pairs of bleed-off valves 123, each pair being disposed at 180 degrees from the other and through outer edges of the valve core top 120, as illustrated. The bleed-off valves 123 are configured to release air from within the pressure sensitive valve core 100 when the male c-clip lock 160d is engaged with the female c-clip locking groove 142c, which in turn occurs when the spring valve mechanism seat 140c and the bottom opening 130b in the spring mechanism housing and lock combination 130 are tightly sealed together.

Since the air pressure within the tire (or other inflatable or pressurized device) has overcome the spring tension force in the Hook's Law spring 146 when the manufacturer's recommended PSI of air pressure has been reached, together with the force applied by the male c-clip lock 160d on the female c-clip locking groove 142c, any additional pressurized air being pumped into the air chuck port 126 by an outside air source will build up within the pressure sensitive valve core 100 and leak out through the bleed-off valves 123, thus preventing the tire from being filled with air beyond the manufacturer's recommended amount of air pressure set during the manufacturing process.

It is to be noted that the Hook's Law spring 146 is designed to be overcome by a predetermined force applied by pressurized air within a tire (or other inflatable devices), and the rigidity of the male c-clip lock 160d is designed to be overcome by pressurized air being forced through the pressure sensitive core 100 through the air chuck port 126. More specifically, the male c-clip lock 160d can be formed of a low friction material which can be overcome with a low pressure forced through the air chuck port 126 from an air pressure source, unless a strong counter force is applied to the bottom of the spring valve mechanism 140 by air pressure within the tire, which is sufficient to overcome the tension force of the Hook's Law spring 146. Further, as pointed out above, the design of the Hook's Law spring 146 can be uniquely and specifically manufactured using Hook's Law $F_s=-kx$ (where $F_s$ is the spring force, k is the spring constant and x is the spring stretch or compression) to be overcome by any desired (i.e., any manufacturer's recommended PSI) force of pressurized air so that the pressure sensitive valve core 100 can be uniquely designed to regulate air pressure within inflatable or pressurized devices designed for any manufacturer's recommended amount of air pressure. Each valve core uniquely designed for a specific manufacturer's recommended PSI can be provided in a corresponding unique color to indicate the internal spring's constant force, stretch and compression specifications determined during manufacturing of each spring 146. The Hook's Law spring 146 can be made from Elgiloy, which is resistant to nitrogen embrittlement, or Haynes 25, which are resistant to oxidation and carburization. However, the Hook's law spring 146 can be made from other materials that provided the intended functions as described herein.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A pressure sensitive valve core usable with a valve stem to force air pressure into an inflatable device attached to the valve stem, comprising:
    a hollow valve core body including external threads to thread into a valve stem, internal top threads disposed at a top opening thereof and internal bottom threads disposed at a bottom opening thereof;
    a valve core top including an air chuck port extending through a center thereof, an air chuck press column having an air chuck press extending from a top side thereof directly above the air chuck port, a valve core top insert extending from a bottom side thereof and including external threads to be threaded to the internal to threads of the valve core body, and an air chuck regulator fixed therein and including at least one air regulator port and a central hole therethrough;
    a spring mechanism housing and lock combination including a threaded insert top including external threads to be threaded with the internal bottom threads of the valve core body, a bottom hole and a valve mechanism fixed to internal sidewalls thereof, the valve mechanism including at least one port hole for air to pass through, a central hole including a male c-clip axially fixed at a first side of the central hole and an insert axially aligned with and extending from a second side of the central hole;
    a spring valve mechanism including:
        a seat disposed along a circumference thereof facing a first direction;
        a circular collar extending from the seat; and
        a spring valve slide extending outward from a center thereof, the spring valve slide extending through a center thereof and including:
            an air pressure check port extending axially therethrough;
            a female c-clip locking groove disposed around the outer surface of the spring valve slide at a position to align with and become engaged with the male c-clip when the spring valve slide is inserted through the bottom hole of the spring mechanism housing and lock combination, through the central hole and through the insert of the valve mechanism, and when the seat thereof is in pressing contact with the bottom hole of the spring mechanism housing and lock combination; and
        a spring disposed around the spring valve slide and configured to apply a spring tension between the spring valve mechanism and the valve mechanism insert; and
    an air pressure check tube having first and second ends thereof and an axial hole extending through the first end and terminating at the second end, the air pressure check tube extending through the air chuck press column, through the central hole of the air chuck regulator and through the air pressure check port of the spring valve slide such that the first end thereof extends out of the air chuck press column and the second end rests within the end of the spring valve slide port, the air pressure check tube including:
        a spring disposed adjacent the first end to limit movement of the air pressure check tube within the pressure sensitive valve core; and an air pressure check valve disposed through a side thereof adjacent the second end thereof and extending to the axial hole such that the air pressure check valve extends out of the air pressure check port of the spring valve slide when pressure is applied to the first end of the air pressure check tube.

2. The pressure sensitive valve core according to claim 1, wherein the air chuck press column is attached to a circumferential surface of the air chuck port such that air pressure can flow between the air chuck press column and the air chuck port.

3. The pressure sensitive valve core according to claim 1, wherein one of the spring valve slide port and the air pressure check tube is formed of a metal coated with a nylon material such that an air-tight seal is formed therebetween and the air pressure check tube is enabled to slide within the spring valve slide port.

4. The pressure sensitive valve core according to claim 1, wherein the spring force of the spring disposed around the spring valve slide is replaceable with another spring having a different force to equate with a corresponding inflatable device's manufacturer recommended PSI limit using Hook's Law $F_s=-kx$ such that the spring valve mechanism will be forced against the bottom opening of the spring mechanism housing and lock combination when the manufacturer recommended PSI limit of the inflatable device equals the force of the spring disposed around the spring valve slide.

5. The pressure sensitive valve core according to claim 4, wherein the spring disposed around the spring valve slide is formed of one of a Haynes 25 alloy or an Elgiloy alloy.

6. The pressure sensitive valve core according to claim 1, wherein:
the air pressure check tube includes a first air gauge spring stop disposed adjacent the first end to limit movement of the air pressure check tube spring thereon; and
the air chuck press column includes a second air gauge spring stop formed within the air chuck press column port to limit a distance in which the air pressure check tube spring can be inserted therein.

7. The pressure sensitive valve core according to claim 6, wherein the air pressure check tube includes a stop disposed at the second end thereof which has a larger diameter than the air pressure check port of the spring valve slide such that the air pressure tube stop is prevented from sliding upward through the air pressure check port.

8. The pressure sensitive valve core according to claim 1, wherein the valve core top includes at least one bleed-off valve extending through outer edges thereof to release air from valve core body when the pressure sensitive valve core is in a closed state.

9. A pressure sensitive valve core usable within a valve stem connected to an inflatable device, comprising:
a body including:
an upper portion having an air chuck port extending through a top center thereof, an air chuck press column having an air chuck press at a first end and extending directly above the air chuck port at a second end, and an air chuck regulator fixed along an inner wall thereof and including at least one air regulator port and a central hole therethrough;
a middle portion including external threads to thread into a valve stem;
a lower portion including bottom opening and a valve mechanism fixed along an inner wall thereof, the valve mechanism including at least one port hole formed therethrough to allow passage of air, a central hole including a male c-clip axially fixed at a first side of the central hole and an insert axially aligned with and extending from a second side of the central hole;
a spring valve mechanism including:
a seat disposed along a circumference thereof facing along a first side thereof; and
a spring valve slide extending from a bottom of the spring valve mechanism outward from the first side thereof and comprising:
an air pressure check port extending axially along a length thereof;
a female c-clip locking groove disposed around an outer surface thereof at a position to align with and become engaged with the male c-clip when the spring valve slide is inserted through the bottom opening of the lower portion of the core body, through the central hole and through the insert of the valve mechanism, and when the seat thereof is in pressing contact with the bottom opening of the lower portion of the core body; and
a spring disposed around the spring valve slide and configured to apply a spring tension between the spring valve mechanism and the valve mechanism insert; and
an air pressure check tube having first and second ends and an axial hole extending through the first end and terminating at the second end, the air pressure check tube extending through the air chuck press column, through the central hole of the air chuck regulator and through the air pressure check port of the spring valve slide such that the first end thereof extends out of the air chuck press column and the second end extends out of the air pressure check port of the spring valve slide, the air pressure check tube including:
a spring disposed adjacent the first end to limit movement of the air pressure check tube within the pressure sensitive valve core; and
an air pressure check valve disposed through a side adjacent the second end thereof and in contact with the axial hole such that the air pressure check valve extends out of the air pressure check port of the spring valve slide when pressure is applied to the first end of the air pressure check tube.

10. The pressure sensitive valve core according to claim 9, wherein the air chuck press column is attached to a circumferential surface of the air chuck port such that air pressure can flow between the air chuck press column and the air chuck port.

11. The pressure sensitive valve core according to claim 9, wherein the spring tension force of the spring disposed around the spring valve slide is formed to equate with an inflatable device's manufacturer recommended PSI limit using Hook's Law $F_s=-kx$ such that the spring valve mechanism will be forced against the bottom opening of the lower portion of the core body when the manufacturer recommended PSI limit of the inflatable device equals the tension force of the spring disposed around the spring valve slide.

12. The pressure sensitive valve core according to claim 9, wherein the body is a single body formed by injection molding.

13. The pressure sensitive valve core according to claim 9, wherein the body is a single body formed of a 3D printing mold.

14. The pressure sensitive valve core according to claim 9, wherein:

the air pressure check tube includes a first air gauge spring stop disposed adjacent the first end to limit movement of the air pressure check tube spring thereon; and the air chuck press column includes a second air gauge spring stop formed within the air chuck press column port to limit a distance in which the air pressure check tube spring can be inserted therein.

15. The pressure sensitive valve core according to claim 14, wherein the air pressure check tube includes a stop disposed at the second end thereof which has a larger diameter than the air pressure check port of the spring valve slide such that the air pressure tube stop is prevented from sliding upward through the air pressure check port.

16. A pressure sensitive valve core usable within a valve stem connected to an inflatable device, comprising:
   a body having a chuck port disposed at a top portion thereof, an air chuck press column extending directly above the air chuck port, external threads formed along an outer surface to thread into a valve stem, and an opening disposed at a bottom portion:
   an air chuck regulator fixed along an inner wall of the body within the top portion and including at least one air regulator port and a central hole therethrough;
   a valve mechanism fixed along an inner wall of the lower portion of the body, the valve mechanism including at least one port hole formed therethrough to allow passage of air, a central hole including a male c-clip axially fixed at a first side of the central hole and an insert axially aligned with and extending from a second side of the central hole;
   a spring valve mechanism including:
      a seat disposed along a circumference of a first side thereof; and
      a spring valve slide extending from a bottom of the spring valve mechanism outward in the direction of the first side thereof and comprising:
         an air pressure check port extending axially along a length thereof;
         a female c-clip locking groove disposed around an outer surface thereof at a position to align with and become engaged with the male c-clip when the spring valve slide is inserted through the bottom opening of the lower portion of the core body, through the central hole and through the insert of the valve mechanism, and when the seat thereof is in pressing contact with the bottom opening of the lower portion of the core body; and
      a spring disposed around the spring valve slide and configured to apply a spring tension between the spring valve mechanism and the valve mechanism insert; and
   an air pressure check tube having first and second ends and an axial hole extending through the first end and terminating at the second end, the air pressure check tube extending through the air chuck press column, through the central hole of the air chuck regulator and through the air pressure check port of the spring valve slide such that the first end thereof extends out of the air chuck press column and the second end past the air pressure check port of the spring valve slide, the air pressure check tube including:
      a spring disposed adjacent the first end to limit movement of the air pressure check tube within the pressure sensitive valve core; and
      an air pressure check valve disposed through a side adjacent the second end thereof such that the air pressure check valve extends out of the air pressure check port of the spring valve slide when pressure is applied to the first end of the air pressure check tube.

17. The pressure sensitive valve core according to claim 16, wherein the body is a single body formed by injection molding.

18. The pressure sensitive valve core according to claim 16, wherein the body is a single body formed of a 3D printing mold.

19. The pressure sensitive valve core according to claim 16, wherein:
   the air pressure check tube includes a first air gauge spring stop disposed adjacent the first end to limit movement of the air pressure check tube spring thereon; and
   the air chuck press column includes a second air gauge spring stop formed within the air chuck press column port to limit a distance in which the air pressure check tube spring can be inserted therein.

20. The pressure sensitive valve core according to claim 19, wherein the air pressure check tube includes a stop disposed at the second end thereof which has a larger diameter than the air pressure check port of the spring valve slide such that the air pressure tube stop is prevented from sliding upward through the air pressure check port.

* * * * *